US008855647B2

(12) United States Patent
Li (10) Patent No.: US 8,855,647 B2
(45) Date of Patent: Oct. 7, 2014

(54) METHOD FOR RADIO RESOURCE CONTROL CONNECTION REESTABLISHMENT AND TERMINAL (71) Applicant: Huawei Technologies Co., Ltd., Shenzhen (CN)

(72) Inventor: Dui Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/759,535

(22) Filed: Feb. 5, 2013

(65) Prior Publication Data
US 2014/0051447 A1 Feb. 20, 2014

(30) Foreign Application Priority Data
Mar. 30, 2012 (CN) .......................... 2012 1 0089864

(51) Int. Cl.
H04W 36/00 (2009.01)
H04W 76/02 (2009.01)
H04W 84/04 (2009.01)

(52) U.S. Cl.
CPC ........ H04W 36/0072 (2013.01); H04W 76/027 (2013.01); H04W 84/045 (2013.01); H04W 76/028 (2013.01); H04W 36/0055 (2013.01)
USPC ........ 455/437; 455/423; 455/435.1; 455/436; 455/414.1; 455/440; 455/442; 455/443; 455/525; 455/524; 455/561; 370/328; 370/329; 370/330; 370/331

(58) Field of Classification Search
CPC ... H04W 36/08; H04W 36/18; H04W 84/045; H04W 36/0055; H04W 36/0072; H04W 76/028; H04W 76/02; H04W 76/027; H04B 7/022

USPC .......... 455/436, 437, 438, 414.1, 423, 435.1, 455/435.2, 440, 442, 443, 524, 52, 5, 561; 370/328–331
See application file for complete search history.

(56) References Cited

U.S. PATENT DOCUMENTS 7,233,788 B2 * 6/2007 Kedem ........................ 455/414.1
7,970,403 B2 * 6/2011 Ishii et al. ..................... 455/436

(Continued)

FOREIGN PATENT DOCUMENTS

GB        2455610 A      6/2009
WO   WO 2011/099745 A2   8/2011

OTHER PUBLICATIONS

Extended European Search Report issued in corresponding European Patent Application No. 13154567.5, mailed May 2, 2013.

Primary Examiner — Olumide T Ajibade Akonai
(74) Attorney, Agent, or Firm — Brinks Gilson & Lione (57) ABSTRACT The present invention relates to a method for radio resource control connection reestablishment and a terminal. After triggering the RRC connection reestablishment, the terminal searches for a cell used for RRC connection reestablishment to use the cell as a target cell, and receives an SIB1 message corresponding to the target cell; extracts first base station identification information from the SIB1 message, and compare the first base station identification information with second base station identification information saved by the terminal; if the two pieces of information are consistent, the terminal camps on the target cell and sends an RRC connection reestablishment request message to a base station to which the target cell belongs, so that the base station to which the target cell belongs performs the RRC connection reestablishment with the terminal.

10 Claims, 4 Drawing Sheets

(56) References Cited

U.S. PATENT DOCUMENTS

| | | |
|---|---|---|
| 8,213,939 B2 * | 7/2012 | Iwamura et al. .............. 455/436 |
| 8,218,505 B2 * | 7/2012 | Iwamura et al. .............. 370/331 |
| 8,515,415 B2 * | 8/2013 | Dimou et al. ................. 455/423 |
| 8,774,135 B2 * | 7/2014 | Narasimha et al. ........... 370/332 |
| 2009/0061878 A1 * | 3/2009 | Fischer ......................... 455/436 |
| 2010/0069072 A1 * | 3/2010 | Gogic et al. .................. 455/436 |
| 2010/0099417 A1 * | 4/2010 | Cho .............................. 455/443 |
| 2010/0113033 A1 * | 5/2010 | Qiu et al. ...................... 455/438 |
| 2010/0195621 A1 * | 8/2010 | Kekki et al. .................. 370/332 |
| 2010/0210268 A1 * | 8/2010 | Lim et al. ..................... 455/436 |
| 2010/0322067 A1 * | 12/2010 | Tenny .......................... 370/216 |
| 2011/0105074 A1 * | 5/2011 | Wu ............................. 455/404.1 |
| 2011/0176526 A1 * | 7/2011 | Jones ........................... 370/338 |
| 2011/0216732 A1 * | 9/2011 | Maeda et al. ................. 370/329 |
| 2011/0217993 A1 * | 9/2011 | Tsutsui ......................... 455/458 |
| 2012/0088498 A1 * | 4/2012 | Xiao et al. .................... 455/424 |
| 2012/0088507 A1 * | 4/2012 | Legg et al. .................... 455/436 |
| 2012/0115469 A1 * | 5/2012 | Chen et al. .................... 455/434 |
| 2012/0207040 A1 * | 8/2012 | Comsa et al. ................. 370/252 |
| 2012/0214489 A1 * | 8/2012 | Koo et al. ..................... 455/436 |
| 2013/0017805 A1 * | 1/2013 | Jonsson et al. ............... 455/411 |
| 2013/0114583 A1 * | 5/2013 | Park et al. ..................... 370/338 |
| 2013/0242866 A1 * | 9/2013 | Lin et al. ...................... 370/328 |
| 2014/0038610 A1 * | 2/2014 | Jeong et al. ................... 455/436 |

* cited by examiner

METHOD FOR RADIO RESOURCE CONTROL CONNECTION REESTABLISHMENT AND TERMINAL

CROSS-REFERENCE TO RELATED APPLICATIONS

This application claims priority to Chinese Patent Application No. 201210089864.6, filed on Mar. 30, 2012, which is hereby incorporated by reference in its entirety.

FIELD OF THE INVENTION

The present invention relates to the field of radio communication technologies, and in particular, to a method for radio resource control connection reestablishment and a terminal.

BACKGROUND OF THE INVENTION

In an existing LTE (Long Term Evolution, long term evolution) system, when a UE (User Equipment, user-side equipment) detects a radio link failure, an intra-LTE handover failure, a failure of a handover to another RAT (Radio Access Type, radio access type), an integrity protection failure indicated by a bottom layer, or an RRC connection reconfiguration failure, the UE can reestablish an RRC (Radio Resource Control, radio resource control) connection, that is, restore a signaling link 1 (Signalling Radio Bearers 1, SRB1), and then reactivate security configuration, so as to rapidly restore data transmission of a user plane.

A premise of successful RRC connection reestablishment is that an eNB (E-UTRAN NodeB, evolved base station) where a target cell is located must include the context of the UE; otherwise, a network will reject the RRC connection reestablishment.

In the prior art, in a process of RRC connection reestablishment, after performing cell selection and finding a cell that meets a condition, the UE camps on the cell and then performs the RRC connection reestablishment in the cell. The prior art has the defect that, the RRC connection reestablishment may be rejected by the network, where a failure may be caused and an opportunity to rapidly restore a signaling link may be missed, thereby lowering a success rate of the RRC connection reestablishment to a great extent.

SUMMARY OF THE INVENTION

Embodiments of the present invention provide a method for radio resource control connection reestablishment and a terminal, which can improve a success rate of the RRC connection reestablishment in a process of performing the radio resource control RRC connection reestablishment.

In one aspect, an embodiment of the present invention provides a method for radio resource control connection reestablishment. The method includes:

searching, by a terminal, for a target cell used for RRC connection reestablishment, and receiving a system information block SIB1 message corresponding to the target cell;

extracting, from the SIB1 message, first base station identification information used for identifying a base station to which the target cell belongs, and comparing the first base station identification information with second base station identification information saved by the terminal; and if the first base station identification information is consistent with the second base station identification information saved by the terminal, camping, by the terminal, on the target cell, and sending an RRC connection reestablishment request message to the base station to which the target cell belongs, so that the base station to which the target cell belongs performs the RRC connection reestablishment with the terminal.

In another aspect, an embodiment of the present invention provides a terminal. The terminal includes:

a receiving unit, configured to search for a target cell used by the terminal to perform RRC connection reestablishment, and receive a system information block SIB1 message corresponding to the target cell;

a comparing unit, configured to extract, from the SIB1 message, first base station identification information used for identifying a base station to which the target cell belongs, and compare the first base station identification information with second base station identification information saved by the terminal; and a first processing unit, configured to: if the first base station identification information is consistent with the second base station identification information saved by the terminal, make the terminal camp on the target cell, and send an RRC connection reestablishment request message to the base station to which the target cell belongs, so that the base station to which the target cell belongs performs the RRC connection reestablishment with the terminal.

In the embodiments of the present invention, after triggering RRC connection reestablishment, a terminal searches for a target cell with high signal quality to perform the RRC connection reestablishment, receives an SIB1 message of the target cell, and extracts, from the message, base station identification information of a base station to which the target cell belongs, and find, through comparison, whether saved base station identification information is consistent with the base station identification information of the base station to which the found target cell belongs, so as to determine whether the base station to which the target cell belongs includes context information of the terminal. Therefore, in the present invention, in the process of radio resource control connection reestablishment, a cell covered by an eNB including the context of a UE is selected for camping, thereby improving the success rate of the radio resource control connection reestablishment.

DETAILED DESCRIPTION OF THE EMBODIMENTS

The technical solutions in the embodiments of the present invention are clearly and completely described in the following with reference to accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

In view of a current situation of RRC connection reestablishment, embodiments of the present invention provide a method for radio resource control connection reestablishment and a terminal. When an RRC connection is reestablished for reasons such as a radio link failure, a handover failure, an integrity protection failure, and an RRC connection reconfiguration failure, a terminal searches for a cell used for the RRC connection reestablishment, uses a cell suitable for the RRC connection reestablishment to use the cell as a target cell, and receives an SIB (System Information Block, system information block) 1 message corresponding to the target cell, and determines, according to the SIB1 message, whether a base station to which the target cell belongs includes local context information. When the base station includes the local context information, the terminal camps on the target cell and sends an RRC connection reestablishment request message to the base station to which the cell belongs. Therefore, in the present invention, in the process of radio resource control connection reestablishment, a cell covered by an eNB including context of a UE is selected for camping, thereby improving a success rate of the radio resource control connection reestablishment.

Figure 1:
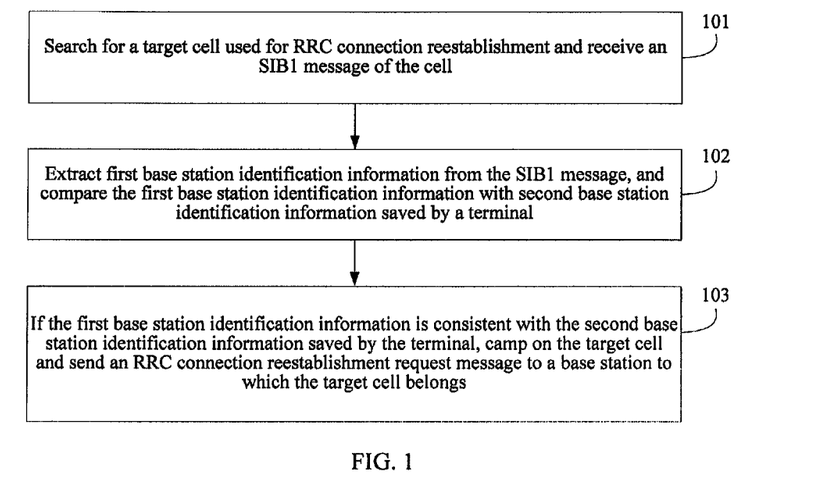
FIG. 1 is a flow chart of a method for radio resource control connection reestablishment according to an embodiment of the present invention.

FIG. 1 is a flow chart of a method for radio resource control connection reestablishment according to an embodiment of the present invention. As shown in FIG. 1, this embodiment includes the following steps:

Step 101: A terminal searches for a target cell used for RRC connection reestablishment, and receives a system information block SIB1 message corresponding to the target cell.

Definitely, when starting the RRC connection reestablishment, the terminal searches for and records a cell of which a value of the quality of a received signal is high, and uses the cell for the RRC reestablishment.

The value of the quality of the signal received by the terminal may be specifically measured by parameters of different types, for example, in an LTE system, RSRP (Reference Signal Receiving Power, reference signal received power) is used to measure the quality of the signal received by the terminal, and in a CDMA (Code Division Multiple Access, code division multiple access) system, the Ec/Io is used to measure the quality of the signal. Persons skilled in the art should understand that, indexes such as the RSCP (Received Signal Code Power, received signal code power) and RSRQ (Reference Signal Receiving Quality, reference signal received quality) may also be used to measure the strength of the signal received by the terminal.

After finding the cell with a high signal quality, the terminal uses the cell as the target cell and captures a system broadcast message of the target cell, where the message includes the SIB1 message. It should be noted that, system information of the cell is included in an SIB (System Information Block, system information block) and is broadcast. An SIB is a set of a group of information elements having a same attribute, and in the 3GPP standard, 19 SIB information blocks (SIB1 to SIB 19) are defined in total, and different SIBs generally include different contents.

The system information block is organized in a tree-like structure. A root node is a master information block (MIB, master Information Block), and the MIB mainly includes reference and scheduling information of a specific SIB block. Specific system information is placed inside an SIB. Sometimes, reference and scheduling information of one to two scheduling blocks (scheduling block) may also be included in the MIB. A function of a scheduling block is to provide the reference and scheduling information of the SIB. Therefore, scheduling information of the SIB may be included in the MIB, and may also be included in a scheduling block.

In the embodiment of the present invention, a system information block SIB1 is mainly used. Because methods for searching for the cell and receiving the system broadcast message of the target cell all belong to the prior art, persons skilled in the art should understand that, content about searching for the cell and receiving the system broadcast message of the target cell is not elaborated herein.

It should be noted that, the terminal in the embodiment of the present invention may be a mobile terminal, and the mobile terminal may be a smart phone, a tablet PC, a PDA (Personal Digital Assistant, Personal Digital Assistant), a mobile vehicular device, and so on. Step 102: The terminal extracts, from the SIB1 message, first base station identification information used for identifying a base station to which the target cell belongs, and compares the first base station identification information with second base station identification information saved by the terminal.

The first base station identification information is identification information of the base station to which the found cell belongs, that is, a globally unique base station identity Global eNB ID. The SIB 1 message itself does not display and carry the Global eNB ID; however, the Global eNB ID may be obtained by combining a CellIdentity and a first PLMN identity in a PLMN-IdentityList that are carried in the message. For a macro base station, a Global eNB ID is obtained by combining a Macro eNB ID and a first PLMN identity in a PLMN-IdentityList, where the Macro eNB ID is composed of higher twenty bits of a CellIdentity. For a small base station, a Global eNB ID is obtained by combining a Home eNB ID and a first PLMN identity in a PLMN-IdentityList, where the Home eNB ID is composed of total twenty-eight bits of a CellIdentity.

The SIB1 message is shown as follows:

```
SystemInformationBlockType1 ::= SEQUENCE {
    cellAccessRelatedInfo           SEQUENCE {
        plmn-IdentityList           PLMN-IdentityList,
        trackingAreaCode            TrackingAreaCode,
        cellIdentity                CellIdentity,
        cellBarred                  ENUMERATED {barred, notBarred},
        intraFreqReselection        ENUMERATED {allowed, notAllowed},
        csg-Indication              BOOLEAN,
        csg-Identity                CSG-Identity  OPTIONAL -- Need OR
    },
    ...
}
PLMN-IdentityList ::=SEQUENCE (SIZE (1..6)) OF PLMN-IdentityInfo
CellIdentity ::=     BIT STRING (SIZE (28))
```

A value of the second base station identification information is relevant to a reason for triggering the RRC connection reestablishment, for example, if an RRC connection reestablishment procedure is triggered because of a radio link failure, the second base station identification information is identification information of a base station to which a first cell belongs when the terminal accesses an RRC connection or successfully performs reselection, that is, identification information of a base station to which a cell that triggers the RRC connection reestablishment because of the radio link failure belongs; and if camping fails during an intra-LTE handover and a handover failure is caused, the second base station identification information not only includes identification information of a base station to which a second cell belongs, where the terminal camps on the second cell before performing the intra-LTE handover, but also includes identification information of a base station to which a third cell belongs, where the terminal reselects and successfully camps on the third cell when performing the intra-LTE handover. Definitely, other reasons for triggering the RRC connection reestablishment exist, for example, reasons such as an integrity protection failure and an RRC connection reconfiguration failure; based on situations that the RRC connection reestablishment is triggered by these reasons, the second base station identification information may be considered as identification information of a base station to which a cell belongs, where the terminal successfully camps on the cell before reasons such as the integrity protection failure and the RRC connection reconfiguration failure occur.

Specifically, a method for comparing the first base station identification information with locally saved second base station identification information may be: performing comparison to find whether the identification information of the base station to which the first cell belongs is consistent with the first base station identification information, or performing comparison to find whether one of the identification information of the base station to which the second cell belongs and the identification information of the base station to which the third cell belongs is consistent with the first base station identification information.

Second base station identification information of the first cell and the second cell is obtained from an SIB1 message of a corresponding cell after the terminal successfully camps, that is, obtained by combining a CellIdentity and a first PLMN identity of a PLMN-IdentityList that are carried in the message. Second base station identification information of the third cell is obtained from a received RRCConnectionReconfiguration (handover) message when the terminal performs the intra-LTE handover. The RRCConnectionReconfiguration (handover) message includes a cell Global eNB ID as shown in the following:

```
RRCConnectionReconfiguration ::= SEQUENCE {
rrc-TransactionIdentifier       RRC-TransactionIdentifier,
criticalExtensions              CHOICE {
c1                              CHOICE{
rrcConnectionReconfiguration-r8   RRCConnectionReconfiguration-r8-IEs,
    spare7 NULL,
    spare6 NULL, spare5 NULL, spare4 NULL,
    spare3 NULL, spare2 NULL, spare1 NULL
},
    criticalExtensionsFuture        SEQUENCE { }
}
}
RRCConnectionReconfiguration-r8-IEs ::= SEQUENCE {
measConfig          MeasConfig                  OPTIONAL,-- Need ON
mobilityControlInfo  MobilityControlInfo        OPTIONAL,-- Cond HO
dedicatedInfoNASList            SEQUENCE (SIZE(1..maxDRB)) OF
                                DedicatedInfoNAS   OPTIONAL,--Cond nonHO
    radioResourceConfigDedicated RadioResourceConfigDedicated   OPTIONAL,-- Cond
HO-toEUTRA
    securityConfigHO        SecurityConfigHO            OPTIONAL,-- Cond HO
    nonCriticalExtension        RRCConnectionReconfiguration-v890-IEs   OPTIONAL
}
RRCConnectionReconfiguration-v890-IEs ::= SEQUENCE {
lateNonCriticalExtension        OCTET STRING            OPTIONAL,-- Need OP
nonCriticalExtension        RRCConnectionReconfiguration-v920-IEs OPTIONAL
}
RRCConnectionReconfiguration-v920-IEs ::= SEQUENCE {
otherConfig-r9   OtherConfig-r9         OPTIONAL,-- Need ON
fullConfig-r9            ENUMERATED {true}       OPTIONAL,   --      Cond
HO-Reestab
    nonCriticalExtension    RRCConnectionReconfiguration-v950-IEs   OPTIONAL
}
RRCConnectionReconfiguration-v950-IEs ::= SEQUENCE {
globaleNBId     GlobaleNBIdEUTRA                OPTIONAL,-- Cond inter-eNB-HO
nonCriticalExtension    SEQUENCE { }            OPTIONAL -- Need OP
}
GlobaleNBIdEUTRA ::=                            SEQUENCE {
  plmn-Identity                                 PLMN-Identity,
  enb-Identity                                  eNB-Identity
}
eNB-Identity ::=                        CHOICE {
macro-eNB-Id                            BIT STRING (SIZE(20)),
home-eNB-Id                             BIT STRING (SIZE(28))
}
SecurityConfigHO ::=                    SEQUENCE {
    handoverType                        CHOICE {
    intraLTE                            SEQUENCE {
        securityAlgorithmConfig     SecurityAlgorithmConfig OPTIONAL,-- Cond
fullConfig
        keyChangeIndicator                      BOOLEAN,
        nextHopChainingCount                    NextHopChainingCount
    },
    interRAT                            SEQUENCE {
        securityAlgorithmConfig                 SecurityAlgorithmConfig,
        nas-SecurityParamToEUTRA                OCTET STRING (SIZE(6))
    }
},
...
}
```

It can be seen from the foregoing codes that, the Global eNB Id is composed of a plmn-Identity and an enb-Identity, where the enb-Identity may be a macro-eNB-Id or a home-eNB-Id.

A base station corresponding to the second base station identification information saves context information of the terminal. If the first base station identification information of the base station to which the found target cell belongs is consistent with the second base station identification information, it indicates that the base station to which the found cell belongs and the base station corresponding to the second base station identification information are the same base station and include the context information of the terminal.

Step 103: If the first base station identification information is consistent with the second base station identification information saved by the terminal, the terminal camps on the target cell and sends an RRC connection reestablishment request message to the base station to which the target cell belongs, so that the base station to which the target cell belongs performs the RRC connection reestablishment with the terminal.

If the first base station identification information is consistent with the second base station identification information, it can be determined that the base station to which the target cell belongs includes the context information of the terminal, and it is deemed that the RRC connection reestablishment can be performed in the target cell, and then the terminal attempts to camp on the cell, and after successfully camping on the cell, the terminal saves the identification information of the base station to which the cell belongs; otherwise, the terminal continues to search for a suitable target cell for the RRC connection reestablishment.

If the base station to which the target cell belongs does not include local context information, the terminal searches for a suitable target cell again and receives an information block SIB1 message of the newly found suitable cell.

After successfully camping on the found target cell, the terminal sends an RRC connection reestablishment request RRCConnectionReestablishmentRequest message to a base station to which the target cell belongs, and performs the RRC connection reestablishment.

In the embodiment of the present invention, after triggering the RRC connection reestablishment, the terminal first searches for the cell used for the RRC connection reestablishment to use the cell as the target cell, and receives the system information block SIB1 message corresponding to the target cell; extracts, from the SIB1 message, the first base station identification information used for identifying the base station to which the target cell belongs, and compares the first base station identification information with the second base station identification information saved by the terminal; if the first base station identification information is consistent with the second base station identification information saved by the terminal, the terminal camps on the target cell and sends the RRC connection reestablishment request message to the base station to which the target cell belongs, so that the base station to which the target cell belongs performs the RRC connection reestablishment with the terminal. Therefore, in the present invention, in the process of the radio resource control connection reestablishment, a cell covered by an eNB including context of a terminal is selected for camping, thereby improving the success rate of radio resource control connection reestablishment.

Figure 2:
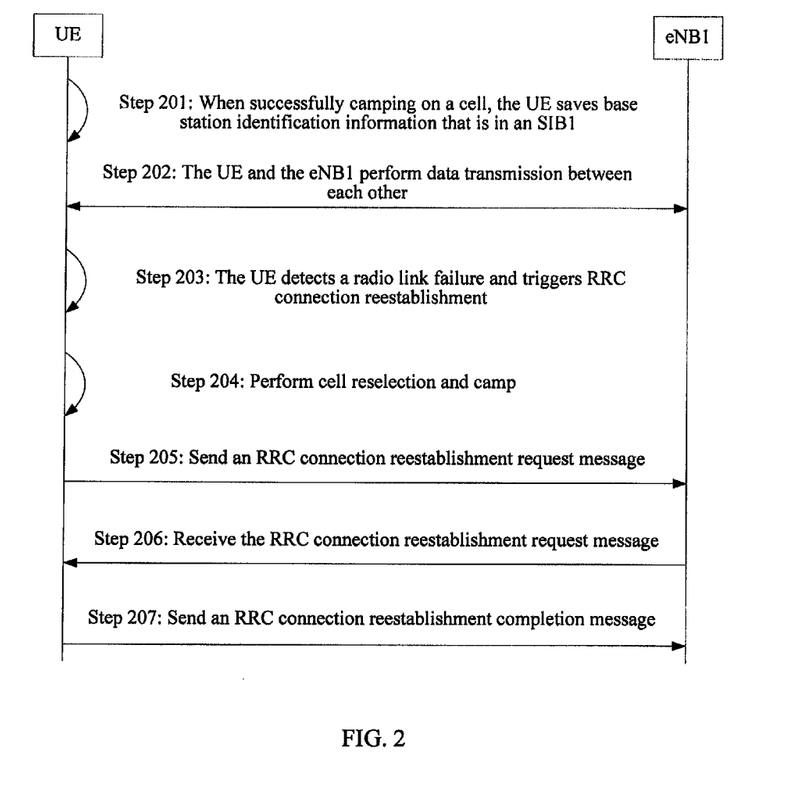
FIG. 2 is a schematic diagram of information exchange of radio resource control connection reestablishment according to an embodiment of the present invention.

FIG. 2 is a schematic diagram of an information exchange process of radio resource control connection reestablishment according to an embodiment of the present invention. As shown in FIG. 2, the information exchange process in this embodiment is as follows:

Step 201: When successfully camping on a cell, a terminal UE saves Global eNB ID information that is in an SIB1 message of the cell where the terminal successfully camps, that is, identification information of a base station eNB1.

After initializing an RRC connection or successfully reselecting a cell, the terminal receives an SIB1 message of a serving cell and saves Global eNB ID information that is in the message, that is, saves identification information of a base station to which the serving cell belongs.

Step 202: The terminal and the base station eNB1 perform data transmission between each other.

Definitely, after the RRC connection is successfully established between the terminal and the base station eNB1 and security configuration is activated, the two perform the data transmission between each other.

Step 203: The terminal detects a radio link failure and triggers RRC connection reestablishment.

When the terminal and the base station eNB1 perform the data transmission between each other, the terminal has a radio link failure in the cell and triggers an RRC connection reestablishment procedure.

Step 204: The terminal searches for a cell and perform comparison to find whether locally saved Global eNB ID information in the SIB1 message of the cell where the terminal successfully camps previously is consistent with Global eNB ID information in an SIB1 message of the found cell; if consistent, camps on the found cell; otherwise, continues to search for a cell.

After triggering the RRC connection reestablishment, the terminal first performs a cell selection operation. After finding a suitable cell, the terminal listens to an SIB1 message of the cell and extracts, from the SIB1 message, Global eNB ID information of a base station to which the cell belongs, and performs comparison to find whether the locally saved Global eNB ID information of the base station eNB1 is consistent with the Global eNB ID information of the found cell; if consistent, it indicates that, the base station to which the found cell belongs is the base station eNB1, that is, the base station to which the found cell belongs includes context information of the terminal, and the terminal camps on the found cell; otherwise, the terminal continues to search for a cell and determines whether a base station to which the newly found cell belongs includes the context information of the terminal.

Step 205: The terminal sends an RRC connection reestablishment request message to the base station eNB1.

Step 206: The terminal receives an RRC connection reestablishment message returned by the base station eNB1.

Because the base station eNB1 definitely includes the context information of the terminal, as long as the base station determines whether a network environment meets other conditions for the RRC connection reestablishment of the terminal, it can be determined whether the RRC connection reestablishment is allowed. If other conditions are also met, the eNB1 allocates a radio resource and sends the RRC connection reestablishment RRCConnectionReestablishment message to the terminal.

Step 207: The terminal sends an RRC connection reestablishment completion message to the base station eNB1.

After receiving the RRC connection reestablishment message returned by the base station eNB1, the terminal performs an SRB1 recovery operation, and sends the RRC connection reestablishment completion RRCConnectionReestablishmentComplete message to the eNB1. After the terminal reactivates the security configuration, the RRC connection enters a connected state, and then the RRC connection reestablishment is completed.

Figure 3:
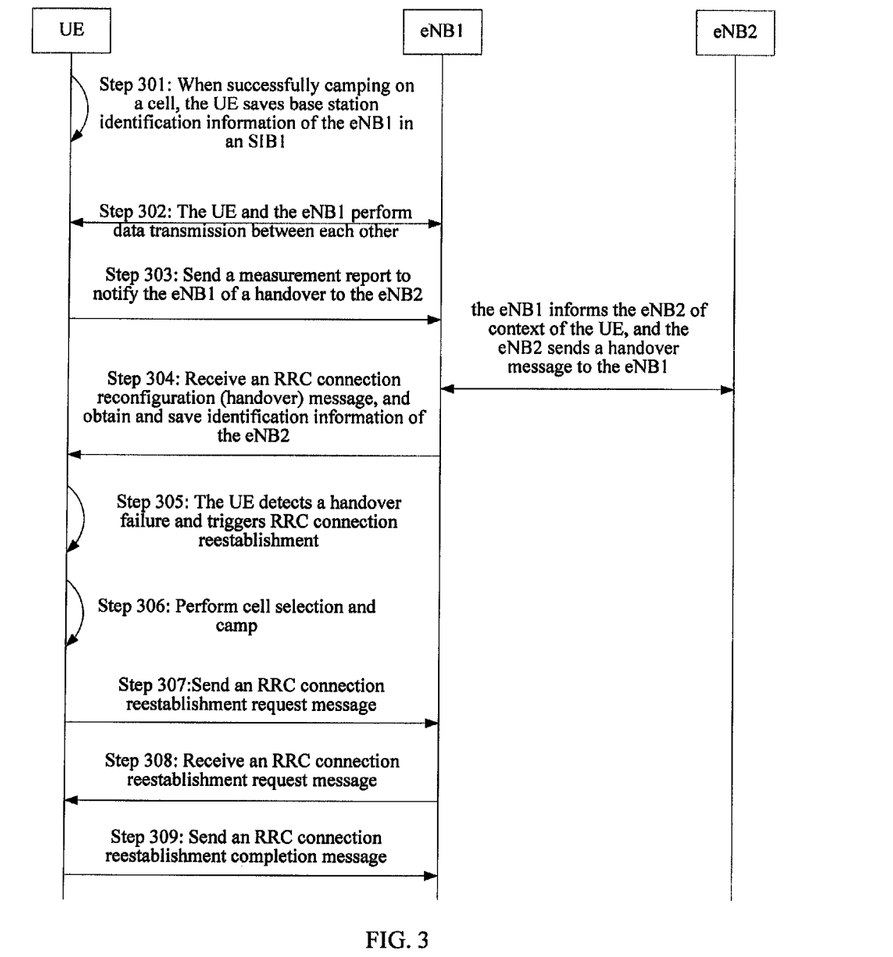
FIG. 3 is another schematic diagram of information exchange of radio resource control connection reestablishment according to an embodiment of the present invention.

FIG. 3 is another schematic diagram of information exchange of radio resource control connection reestablishment according to an embodiment of the present invention. As shown in FIG. 3, an information exchange process in this embodiment is as follows:

Step 301: When successfully camping on a cell, a terminal UE saves Global eNB ID information that is in an SIB1 message of the cell where the terminal successfully camps, that is, identification information of a base station eNB1.

After initializing an RRC connection or successfully reselecting a cell, the terminal receives an SIB1 message of a serving cell and saves Global eNB ID information that is in the message, that is, saves identification information of a base station to which the serving cell belongs.

Step 302: The terminal and the base station eNB1 perform data transmission between each other.

Definitely, after the RRC connection is successfully established between the terminal and the base station eNB1 and security configuration is activated, the two perform the data transmission between each other.

Step 303: The terminal sends a measurement report to the base station eNB1 to notify the eNB1 of a handover from the base station eNBb1 to a base station eNB2.

When moving from one position to another position, the terminal notifies, according to the measurement report, the eNB1 of the handover from the base station eNB1 to the base station eNBb2. Definitely, after receiving the notification message, the eNB1 sends context information of the terminal to the eNB2, and the eNB2 also sends a handover message to the eNB1.

Step 304: The terminal receives an RRC connection reconfiguration (handover) message sent by the base station eNB1, and obtains and saves identification information of the base station eNB2 carried in the message.

After receiving the handover message sent by the eNB2, the eNB1 sends the RRC connection reconfiguration (handover) RRCConnectionReconfiguration (handover) message to the terminal. After receiving the handover message, the terminal obtains Global eNB ID information of the eNB2 carried in the message and locally saves the information.

Step 305: The terminal detects a handover failure and triggers the RRC connection reestablishment.

When performing a handover, the terminal fails to camp on a cell and further, a handover failure is caused; and the terminal triggers an RRC connection reestablishment procedure.

Step 306: The terminal searches for a cell and performs comparison to find whether the locally saved Global eNB ID information of the eNB1 and the locally saved Global eNB ID information of the eNB2 are consistent with Global eNB ID information in an SIB1 message of the found cell; if consistent, camps on the found cell; otherwise, continues to search for a cell.

After triggering the RRC connection reestablishment, the terminal first performs a cell selection operation. After finding a suitable cell, the terminal listens to an SIB1 message of the cell and extracts, from the SIB1 message, Global eNB ID information of a base station to which the cell belongs, and performs comparison to find whether the locally saved Global eNB ID information of the base station eNB 1 and the locally saved Global eNB ID information of the eNB2 are consistent with the Global eNB ID information of the found cell; if consistent, it indicates that a base station to which the found cell belongs is the base station eNB1 or the base station eNB2, that is, the base station to which the found cell belongs includes the context information of the terminal, and the terminal camps on the found cell; otherwise, the terminal continues to search for a cell and determines whether a base station to which the newly found cell belongs includes the context information of the terminal.

Step 307: The terminal sends an RRC connection reestablishment request message.

Step 308: The terminal receives an RRC connection reestablishment message returned by the base station to which the found cell belongs, that is, the base station eNB1 or the base station eNB2.

Because the base station eNB1 and the base station eNB2 definitely include the context information of the terminal, as long as it is determined whether a network environment meets other conditions of the RRC connection reestablishment of the terminal, it can be determined whether the RRC connection reestablishment is allowed. If other conditions are also met, the base station eNB1 or the base station eNB2 allocates a radio resource for the terminal and sends the RRC connection reestablishment RRCConnectionReestablishment message to the terminal.

Step 309: The terminal sends an RRC connection reestablishment completion message to the base station to which the found cell belongs, that is, the base station eNB1 or the base station eNB2.

After receiving the RRC connection reestablishment message, the terminal performs an SRB1 recovery operation, and sends the RRC connection reestablishment completion RRCConnectionReestablishmentComplete message to the base station. After the terminal reactivates the security configuration, the RRC connection enters a connected state, and then the RRC connection reestablishment is completed.

Figure 4:
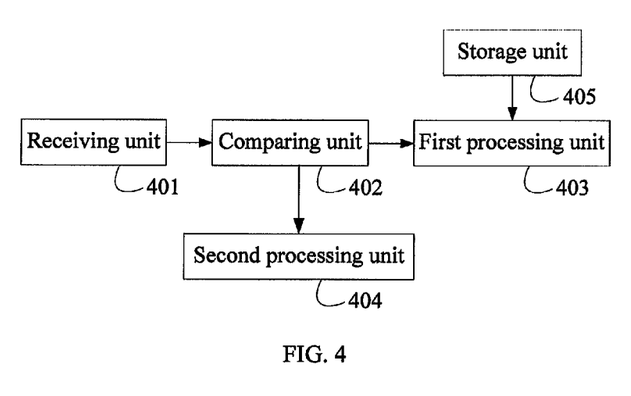
FIG. 4 is a schematic diagram of a terminal according to an embodiment of the present invention.

FIG. 4 is a schematic diagram of a terminal according to an embodiment of the present invention. As shown in FIG. 4, the terminal in this embodiment includes the following units:

A receiving unit 401 is configured to search for a cell used by the terminal to perform RRC connection reestablishment to use the cell as a target cell, and receive a system information block SIB1 message corresponding to the target cell; and A comparing unit 402 is configured to extract, from the SIB1 message, first base station identification information used for identifying a base station to which the target cell belongs, and compare the first base station identification information with second base station identification information saved by the terminal.

The first base station identification information is identification information of the base station to which the found target cell belongs, that is, a globally unique base station identity Global eNB ID. The SIB 1 message itself does not display and carry the Global eNB ID; however, the Global eNB ID may be obtained by combining a CellIdentity and a first PLMN identity in a PLMN-IdentityList that are carried in the message.

A value of the second base station identification information is relevant to a reason for triggering the RRC connection reestablishment. If an RRC connection reestablishment procedure is triggered because of a radio link failure, the second base station identification information is identification information of a base station to which a first cell belongs when the terminal accesses an RRC connection or successfully performs reselection, that is, identification information of a base station to which a cell that triggers the RRC connection reestablishment because of the radio link failure belongs; and if camping fails during an intra-LTE handover and a handover failure is caused, the second base station identification information not only includes identification information of a base station to which a second cell belongs, where the terminal camps on the second cell before performing the intra-LTE handover, but also includes identification information of a base station to which a third cell belongs, where the terminal reselects and successfully camps on the third cell when performing the intra-LTE handover.

The comparing unit 402 is specifically configured to: perform comparison to find whether the identification information of the base station to which the first cell belongs is consistent with the first base station identification information; or perform comparison to find whether one of the identification information of the base station to which the second cell belongs and the identification information of the base station to which the third cell belongs is consistent with the first base station identification information.

A base station corresponding to the second base station identification information saves context information of the terminal. If the first base station identification information of the base station to which the found cell belongs is consistent with the second base station identification information, it indicates that the base station to which the found cell belongs and the base station corresponding to the second base station identification information are the same base station and include the context information of the terminal.

A first processing unit 403 is configured to: if the first base station identification information is consistent with the second base station identification information saved by the terminal, make the terminal camp on the target cell, and send an RRC connection reestablishment request message to the base station to which the target cell belongs, so that the base station to which the target cell belongs performs the RRC connection reestablishment with the terminal.

Preferably, this embodiment further includes: a second processing unit 404, configured to, when the first base station identification information is not consistent with the second base station identification information saved by the terminal, the terminal to search for a target cell again.

When a determination result of the comparing unit 402 is that the first base station identification information is not consistent with the second base station identification information saved by the terminal, it is determined that the base station to which the target cell belongs does not include local context information; and the second processing unit 404 searches for a suitable target cell again and receives an information block SIB1 message of the newly found target cell.

Preferably, this embodiment further includes: a storage unit 405, configured to save identification information of a base station to which a target cell where the terminal successfully camps belongs.

In the embodiment of the present invention, the terminal searches for the cell used for the RRC connection reestablishment to use the cell as the target cell, and receives the system information block SIB1 message corresponding to the target cell; extracts, from the SIB1 message, the first base station identification information used for identifying the base station to which the target cell belongs, and compares the first base station identification information with the second base station identification information saved by the terminal; if the first base station identification information is consistent with the second base station identification information saved by the terminal, the terminal camps on the target cell and sends the RRC connection reestablishment request message to the base station to which the target cell belongs, so that the base station to which the target cell belongs performs the RRC connection reestablishment with the terminal. Therefore, in the present invention, in the process of the radio resource control connection reestablishment, a cell covered by an eNB including the context of a UE is selected for camping, thereby improving a success rate of the radio resource control connection reestablishment.

Persons skilled in the art may further be aware that, units and algorithm steps in the examples described in combination with the embodiments disclosed in this document can be implemented by electronic hardware, computer software, or a combination of the two. In order to clearly describe the interchangeability between the hardware and the software, the foregoing illustration has generally described compositions and steps of each example according to functions. Whether these functions are executed by hardware or by software depends on particular applications and design constraint conditions of the technical solutions. Persons skilled in the art may use different methods to implement the described functions for each particular application, such implementation should not be deemed to go beyond the scope of the present invention.

The steps of the method or algorithm described in combination with the embodiments disclosed in this document may be implemented directly by hardware, by a software module executed by a processor, or in a combination of the two. The software module may be located in a random access memory (RAM), a computer memory, a read only memory (ROM), an electrically programmable ROM, an electrically erasable programmable ROM, a register, a hard disk, a removable disk, a CD-ROM, or any other storage medium well-known in the art.

The objectives, technical solutions, and beneficial effects of the present invention are further described in detail in the foregoing specific embodiments. It should be understood that the foregoing descriptions are only specific implementation manners of the present invention, but are not intended to limit the protection scope of the present invention. Any modification, equivalent replacement, or improvement made within the spirit and principle of the present invention shall fall within the protection scope of the present invention.

What is claimed is:

1. A method for radio resource control RRC connection reestablishment, wherein the method comprises:

searching, by a terminal, for a target cell used for RRC connection reestablishment, and receiving a system information block SIB1 message corresponding to the target cell;

extracting, from the SIB1 message, first base station identification information used for identifying a base station to which the target cell belongs, and comparing the first base station identification information with second base station identification information saved by the terminal to determine whether the base station includes context information of the terminal; and if the first base station identification information is consistent with the second base station identification information saved by the terminal, camping, by the terminal, on the target cell, and sending an RRC connection reestablishment request message to the base station to which the target cell belongs and which is determined to include the context information of the terminal, so that the base station to which the target cell belongs performs the RRC connection reestablishment with the terminal.

2. The method for RRC connection reestablishment according to claim 1, wherein the second base station identification information saved by the terminal specifically comprises: identification information of a base station to which a first cell belongs, wherein the terminal successfully camps on the first cell when the terminal initially establishes an RRC connection; or identification information of a base station to which a second cell belongs, wherein the terminal camps on the second cell before an intra-LTE handover when the terminal performs the long term evolution intra-LTE handover, and identification information of a base station to which a third cell belongs, wherein the terminal reselects and successfully camps on the third cell when the terminal performs the intra-LTE handover.

3. The method for RRC connection reestablishment according to claim 1, further comprising: if the first base station identification information is not consistent with the second base station identification information saved by the terminal, searching, by the terminal, again for a target cell used for the RRC connection reestablishment.

4. The method for RRC connection reestablishment according to claim 2, wherein the comparing the first base station identification information with the second base station identification information saved by the terminal specifically comprises: performing comparison to find whether the identification information of the base station to which the first cell belongs is consistent with the first base station identification information; or performing comparison to find whether one of the identification information of the base station to which the second cell belongs and the identification information of the base station to which the third cell belongs is consistent with the first base station identification information.

5. The method for RRC connection reestablishment according to claim 1, after the terminal camps on the target cell, further comprising: saving identification information of the base station to which the target cell where the terminal successfully camps belongs.

6. A terminal, wherein the terminal comprises:
a receiving unit, configured to search for a target cell used for RRC connection reestablishment, and receive a system information block SIB1 message corresponding to the target cell;
a comparing unit, configured to extract, from the SIB1 message, first base station identification information used for identifying a base station to which the target cell belongs, and compare the first base station identification information with second base station identification information saved by the terminal to determine whether the base station includes context information of the terminal; and
a first processing unit, configured to: if the first base station identification information is consistent with the second base station identification information saved by the terminal, make the terminal camp on the target cell, and send an RRC connection reestablishment request message to the base station to which the target cell belongs and which is determined to include the context information of the terminal, so that the base station to which the target cell belongs performs the RRC connection reestablishment with the terminal.

7. The terminal according to claim 6, wherein the second base station identification information saved by the terminal specifically comprises: identification information of a base station to which a first cell belongs, wherein the terminal successfully camps on the first cell when the terminal initially establishes an RRC connection or identification information of a base station to which a second cell belongs, wherein the terminal camps on the second cell before an intra-LTE handover when the terminal performs the long term evolution intra-LTE handover, and identification information of a base station to which a third cell belongs, wherein the terminal reselects and successfully camps on the third cell when the terminal performs the intra-LTE handover.

8. The terminal according to claim 6, wherein further comprises: a second processing unit, configured to search again for a target cell used for the RRC connection reestablishment, when the first base station identification information is not consistent with the second base station identification information saved by the terminal.

9. The terminal according to claim 7, wherein the comparing unit is specifically configured to: perform comparison to find whether the identification information of the base station to which the first cell belongs is consistent with the first base station identification information; or perform comparison to find whether one of the identification information of the base station to which the second cell belongs and the identification information of the base station to which the third cell belongs is consistent with the first base station identification information.

10. The terminal according to claim 6, wherein the apparatus further comprises: a storage unit, configured to save identification information of the base station to which the target cell where the terminal successfully camps belongs.

* * * * *